(12) United States Patent
Hildebrandt et al.

(10) Patent No.: US 6,978,026 B2
(45) Date of Patent: Dec. 20, 2005

(54) CIRCUIT ARRANGEMENT FOR GAINING A STEREO SUBCARRIER AND AN RDS CARRIER

(75) Inventors: Guenter Hildebrandt, Buxtehude (DE); Gerrit Jan Groot Hulze, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 767 days.

(21) Appl. No.: 10/083,334

(22) Filed: Oct. 22, 2001

(65) Prior Publication Data

US 2002/0131603 A1  Sep. 19, 2002

(30) Foreign Application Priority Data

Oct. 24, 2000  (DE)  ................ 100 52 557

(51) Int. Cl.[7] ............................................. H04H 5/00
(52) U.S. Cl. .................. 381/2; 381/4; 381/3; 455/260; 455/45; 455/46; 455/202
(58) Field of Search ................. 381/1–3, 4, 14–16; 455/260, 45–46, 202, 205, 265; 348/486, 348/485, 738

(56) References Cited

U.S. PATENT DOCUMENTS

| | | | |
|---|---|---|---|
| 4,096,360 A | * | 6/1978 | Takahashi et al. ............. 381/1 |
| 5,432,855 A | * | 7/1995 | Koo et al. ..................... 381/12 |
| 5,507,024 A | * | 4/1996 | Richards, Jr. .................. 381/4 |
| 6,694,026 B1 | * | 2/2004 | Green ............................ 381/3 |

* cited by examiner

Primary Examiner—Vivian Chin
Assistant Examiner—Justin Michalski
(74) Attorney, Agent, or Firm—Michael J. Ure

(57) ABSTRACT

According to the invention, a circuit arrangement for gaining a 38 kHz stereo subcarrier and a 57 kHz RDS carrier for decoding a stereo signal comprised in a demodulated FM signal and/or an RDS signal comprised in a demodulated FM signal, having a simple structure with only one PLL and particularly only one voltage-controlled oscillator (2) is characterized in that the arrangement comprises a phase-locked loop with a loop filter (1), a voltage-controlled oscillator (2), a first phase detector (3) which receives a reference signal having a reference frequency, and a second phase detector (4), which receives the FM signal, the output signal of the voltage-controlled oscillator (2) being coupled to both phase detectors (3, 4) in a form divided down by means of dividers (6, 9; 10, 11), and the signal fed back to the second phase detector having a frequency of 19 kHz, in that dividers (9, 10, 12) are provided, by means of which the output signal of the voltage-controlled oscillator (2) is divided down and which supply the 38 kHz stereo subcarrier and the 57 kHz RDS carrier, in that a frequency control circuit (8), which is active only upon start-up of the circuit arrangement, compares the two signals applied to the first phase detector (3) and controls the voltage-controlled oscillator (2) in a predetermined frequency range around the reference frequency of the reference signal, in that, after reaching the predetermined frequency range, the frequency control circuit (8) is deactivated and the output signal of the first phase detector (3) is coupled to the loop filter (1), and in that subsequently, if the demodulated FM signal should comprise a 19 kHz pilot, the output signal of the second phase detector (4) is coupled to the loop filter (1).

9 Claims, 1 Drawing Sheet

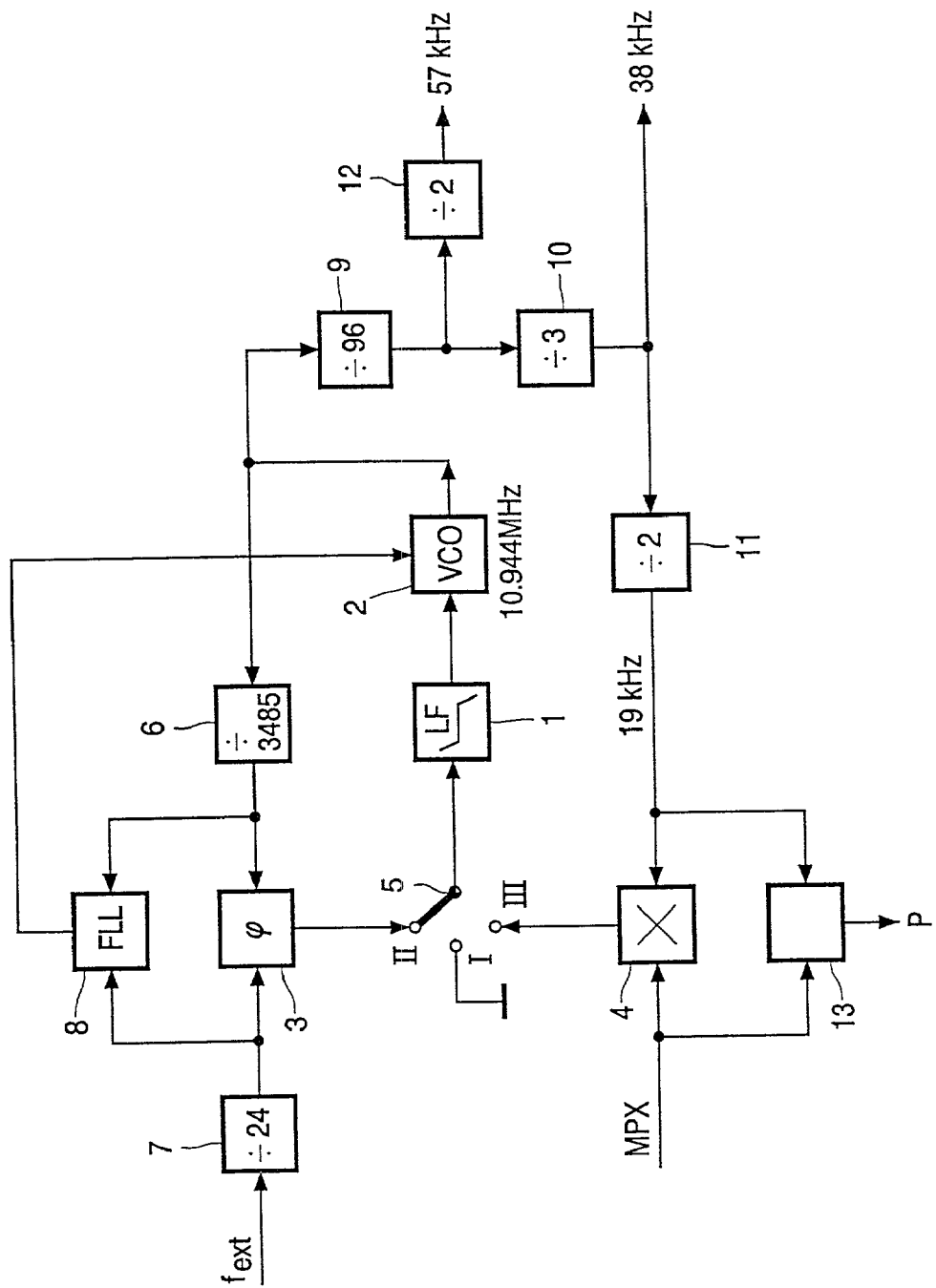

CIRCUIT ARRANGEMENT FOR GAINING A STEREO SUBCARRIER AND AN RDS CARRIER

The invention relates to a circuit arrangement for gaining a 38 kHz stereo subcarrier and a 57 kHz RDS carrier for decoding a stereo signal comprised in a demodulated FM signal and/or an RDS signal comprised in a demodulated FM signal.

Stereo FM signals comprise a pilot at a frequency of 19 kHz. The sidebands of the stereo signal L–R adjoin the frequency range of 23 to 53 kHz. For demodulating this signal, a frequency of 38 kHz is to be gained, which frequency is generally denoted as stereo subcarrier. It may be derived from the pilot frequency of 19 kHz. When RDS information is additionally transmitted in the FM signal, an RDS carrier of 57 kHz is modulated on this signal.

After the FM signal is demodulated at the receiver end, it has the above-mentioned spectrum. Consequently, a stereo subcarrier of 38 kHz is to be generated for regaining the stereo signal and an RDS carrier of 57 kHz is to be generated for regaining the RDS information. In concepts known in the state of the art, separate circuit arrangements are generally provided for gaining these two carriers. A phase control loop is mostly provided for gaining the 38 kHz stereo subcarrier. Additionally, a quartz oscillator or the like is provided for gaining the RDS carrier. It is also possible to use two separate PLLs for gaining the two carriers, but this involves a higher number of circuit-technical components and has the additional drawback that two oscillators provided on a common crystal and operating at similar frequencies influence each other.

It is an object of the invention to provide a circuit arrangement of the type described in the opening paragraph, having a possibly simple construction and excluding mutual influence of two voltage-controlled oscillators.

According to the invention, this object is solved in that the arrangement comprises a phase-locked loop with a loop filter, a voltage-controlled oscillator, a first phase detector which receives a reference signal having a reference frequency, and a second phase detector, which receives the FM signal, the output signal of the voltage-controlled oscillator being coupled to both phase detectors in a form divided down by means of dividers, and the signal fed back to the second phase detector having a frequency of 19 kHz, in that dividers are provided, by means of which the output signal of the voltage-controlled oscillator is divided down and which supply the 38 kHz stereo subcarrier and the 57 kHz RDS carrier, in that a frequency control circuit, which is active only upon start-up of the circuit arrangement, compares the two signals applied to the first phase detector and controls the voltage-controlled oscillator in a predetermined frequency range around the reference frequency of the reference signal, in that, after reaching the predetermined frequency range, the frequency control circuit is deactivated and the output signal of the first phase detector is coupled to the loop filter, and in that subsequently, if the demodulated FM signal should comprise a 19 kHz pilot, the output signal of the second phase detector is coupled to the loop filter.

The fundamental aspect of the circuit arrangement according to the invention is that only one loop filter and one voltage-controlled oscillator are used for gaining the stereo subcarrier at a frequency of 38 kHz as well as for gaining the RDS carrier at a frequency of 57 kHz, while the RDS carrier can also be regained in FM signals without a pilot. The voltage-controlled oscillator operates at a relatively high frequency which is divided down by means of a plurality of dividers. The above-mentioned frequencies are gained by means of this down-division. Mutual influence of voltage-controlled oscillators is thus excluded. No separate quartz is required for gaining the RDS carrier.

Two phase detectors are provided, between which switching takes place. This switching is dependent on whether the FM signal for which the stereo subcarrier and the RDS carrier are gained has a pilot, in other words, whether actually a stereo signal is concerned.

In the case of start-up of the circuit arrangement, a frequency control circuit is first activated which compares a down-divided reference signal and the down-divided output signal of the voltage-controlled oscillator and controls the voltage-controlled oscillator in such a way that it is controlled around the reference frequency of the reference signal within a predetermined frequency range.

As soon as this is reached, the PLL is deactivated and the first phase detector is activated. The down-divided reference signal as well as the down-divided output signal of the voltage-controlled oscillator are applied to the first phase detector. In this mode of operation, the PLL operates in such a way that it adjusts itself at the down-divided frequency of the reference signal. In this mode of operation, the oscillator frequency has already been pre-adjusted at an accuracy of a few Hertz.

When subsequently a pilot is detected, the second phase detector is activated, which compares the down-divided output signal of the voltage-controlled oscillator and the pilot at a frequency of 19 kHz in the FM signal. In this mode of operation, the PLL adjusts itself very accurately to the actual frequency of the pilot in the FM signal.

In this three-step mode of operation of the circuit arrangement according to the invention, the advantage is obtained that the PLL may have a very narrow band because it is already fairly accurately pre-adjusted at the nominal frequency upon start-up, and only after this has been effected is a lock-in on the pilot carrier frequency required, which carrier frequency is then already very close to the operating frequency of the voltage-controlled oscillator. Consequently, the bandwidth of the PLL may be very narrow. This in turn has the advantage that the PLL certainly locks in, also at a small amplitude of the pilot.

In summary, both the stereo subcarrier and the RDS carrier can be gained by means of the circuit arrangement according to the invention, which comprises only one PLL and thus only one voltage-controlled oscillator. Due to the narrow band of the PLL, an optimal behavior can be achieved. Nevertheless, lock-in is ensured by the three modes of operation.

If the PLL should unlock in this third mode of operation, in which the output signal of the second phase detector is fed back to the input of the loop filter, the circuit arrangement is again reset to the second mode of operation, as defined in claim 2, in which mode of operation the output signal of the first phase detector is coupled to the loop filter. In this mode of operation, the PLL locks in again on the reference frequency.

In accordance with a further embodiment of the invention as defined in claim 4, a pilot detector is used which deals with the two input signals of the second phase detector. This embodiment of the circuit arrangement involves a small number of circuit components because the two input signals of the second phase detector can be directly used for pilot detection.

Since the operating frequency of the voltage-controlled oscillator is chosen to have a favorable value and since particularly this value is in a high frequency range, dividers may be provided, as defined in claim 5, which dividers may be used for gaining the stereo subcarrier, the RDS carrier as well as the input signal of the second phase detector. These dividers can thus simultaneously fulfill a plurality of assignments.

In accordance with a further embodiment of the invention, as defined in claim 6, the voltage-controlled oscillator may advantageously have a nominal frequency of 10.944 MHz. The input signal of the first phase detector can then be advantageously and easily gained from this frequency by means of a divider, dividing by 3485.

In accordance with a further embodiment of the invention as defined in claim 7, the reference signal has a reference frequency of 75.368/24 MHz. The 75.368 MHz can be advantageously gained from a quartz frequency of 20.5 MHz by dividing by 272.

In the second and third modes of operation of the circuit arrangement according to the invention, in which either the output signal of the first or of the second phase detector is fed back to the input of the loop filter, the PLL is to be deactivated. This is advantageously achieved in that, in accordance with a further embodiment of the invention as defined in claim 9, the frequency control circuit is switched off in this case.

These and other aspects of the invention are apparent from and will be elucidated with reference to the embodiments described hereinafter.

In the drawing:

The sole FIGURE is a block diagram of a circuit arrangement according to the invention for gaining a 38 kHz stereo subcarrier and a 57 kHz RDS carrier.

The circuit arrangement receives a demodulated FM signal which is denoted as MPX in the FIGURE. In the baseband, this signal comprises a stereo sum signal L+R up to approximately 15 kHz, where L is the left channel and R is the right channel. At about 19 kHz, this signal comprises a pilot which signalizes that a stereo signal is concerned. Two sidebands of a difference signal L−R extend between 23 kHz and 53 kHz. These sidebands extend around 38 kHz. For demodulating this difference signal, a stereo subcarrier having a frequency of 38 kHz is required at the receiver end.

RDS information may be additionally transmitted in the signal, the letters RDS standing for Radio Data System. This information is modulated on an RDS carrier at a frequency of 57 kHz.

The circuit arrangement according to the invention should be capable of gaining the stereo subcarrier of 38 kHz and the RDS carrier of 57 kHz. To this end, the block diagram of the circuit arrangement according to the invention includes a PLL comprising a loop filter 1 and a subsequent controllable oscillator 2. The controllable oscillator 2 operates at a nominal frequency of 10.944 MHz.

The circuit arrangement further comprises a first, digital phase detector 3 and a second, linear phase detector 4. The output signals of the two phase detectors are alternately switchable to the input of the loop filter 1 via a switch 5. A reference potential can be coupled to the input of the loop filter 1 via the switch 5.

Dependent on the position of the switch 5, the PLL operates either with the first phase detector 3 or with the second phase detector 4. In the third mode of operation, the VCO is controlled by none of the two phase detectors 3 and 4.

The output signal of the voltage-controlled oscillator 2 is supplied via a divider 6 which divides the signal by the natural number of 3485. The output signal of the divider 6 is applied to an input of the first, digital phase detector 3. A reference signal having a reference frequency which is 75.368 divided by 24 MHz is applied to the second input of this phase detector 3. The quotient 24 is realized by a divider 7. The external signal denoted by $f_{ext}$ in the FIGURE has a frequency of 75.368 MHz and may be gained, for example, from a quartz oscillator at 20.5 MHz operating frequency by dividing by the quotient 272.

The circuit arrangement further comprises a frequency control circuit 8, both of whose inputs receive the same input signals as the first, digital phase detector 3. The output signal of the frequency control circuit is coupled to the voltage-controlled oscillator 2.

The output signal of the voltage-controlled oscillator 2 is further applied to an input of the second, linear phase detector 4 via a divider 9, which operates at a quotient of 96, a divider 10, which operates at a quotient of 3, and a divider 11, which operates at a quotient of 2. The demodulated FM signal, denoted by MPX in the FIGURE, is applied to another input of this phase detector 4.

The output signal of the divider 9 is applied to a divider 12, which operates at a quotient of 2. Based on the nominal operating frequency of 10.944 MHz of the controllable oscillator, the divider 12 supplies a signal at about 57 kHz at the output, which signal is provided as a regained RDS carrier. In a corresponding manner and on the basis of the dividing ratios, the divider 10 supplies the stereo subcarrier at a frequency of 38 kHz.

The two input signals applied to the second, linear phase detector 4 are also applied to a pilot detector 13 whose mode of operation will herein not be elucidated. By comparing the FM stereo signal MPX and the output signal of the divider 11, having a frequency of 19 kHz, the pilot detector can determine by way of superposition whether the signal MPX comprises a pilot or not. The pilot detector 13 supplies a corresponding signal P.

The mode of operation of the circuit arrangement will now be elucidated.

Upon start-up of the circuit arrangement, i.e. after activation of the current or voltage supply for the circuit arrangement, it is initially ensured according to the invention that the voltage-controlled oscillator 2 operates approximately at the nominal operating frequency of 10.944 MHz. To this end, the switch 5 is initially to be put to position I. In this position, the voltage-controlled oscillator 2 is controlled by the frequency control circuit 8 only. This frequency control circuit compares the down-divided operating frequency of the voltage-controlled oscillator 2 with the frequency of the reference signal which is supplied by divider 7. This reference frequency is chosen to be such that the voltage-controlled oscillator is adjusted by the frequency control circuit 8 at the nominal operating frequency of 10.944 MHz.

When the voltage-controlled oscillator 2 has reached this operating frequency, the switch 5 is set to position II, and the frequency control circuit 8 is simultaneously deactivated. Consequently, the phase detector 3, the loop filter 1 and the voltage-controlled oscillator 2 operate as a PLL. Now, the voltage-controlled oscillator 2 is adjusted in this PLL exactly at the reference signal and its reference frequency as regards frequency and phase, respectively, which reference signal is applied to the second input of the phase detector 3.

In this mode of operation, the circuit arrangement is already capable of supplying a quite exact RDS carrier of 57 kHz whose frequency accuracy is sufficient to demodulate RDS information which may be modulated on the MPX signal.

The pilot detector 13 now continuously determines whether the MPX signal is a stereo signal comprising a pilot. As soon as this is the case and as soon as the pilot detector supplies the corresponding signal P, the electronic switch 5 is set to position III. Now, a PLL is active, which comprises the second linear phase detector 4, the loop filter 1 and the voltage-controlled oscillator 2. This PLL now exactly locks in on the frequency of the pilot in the MPX signal. The divider 10 thus supplies a stereo subcarrier of 38 kHz which, as regards frequency and phase, is adjusted correctly relative to the pilot of the MPX signal.

A stereo decoder, which is not shown in the FIGURE, can thus demodulate the above-mentioned stereo signal by means of this stereo subcarrier.

In the case of continuous operation, the PLL may unlock in a mode of operation in which the switch is in position III. In this case, the switch 5 is set to position II again so that the operating frequency of the PLL and of the voltage-controlled oscillator is maintained at about the nominal frequency and is only dependent on the reference frequency. As soon as a pilot is then detected again, the switch 5 is reset to position III.

An essential advantage of this circuit arrangement is that the voltage-controlled oscillator is already set fairly accurately at the nominal operating frequency when the switch 5 is in position II. The PLL can therefore easily lock in when switching switch 5 to position III and may thus have a very narrow band. This has the advantage that the PLL also certainly locks in at a small amplitude of the pilot.

Moreover, both carrier signals, namely the RDS carrier at 57 kHz and the stereo subcarrier at 38 kHz, are gained by means of the circuit arrangement according to the invention, comprising only one PLL or, more precisely, only one voltage-controlled oscillator 2.

It will be evident that the PLL locks in very accurately at the frequency of the MPX signal, if it is actually a stereo signal with a pilot, so that the 38 kHz and 57 kHz signals supplied by the circuit arrangement very exactly have these nominal frequencies. The MPX signal may be a mono signal which does not comprise a pilot. In accordance with the mode of operation described above, the circuit 5 is left in position II in this case, because no pilot is detected. In this mode of operation of the circuit arrangement, the stereo subcarrier at a frequency of 38 kHz is not required but the MPX signal may comprise an RDS signal so that the RDS carrier at a frequency of 57 kHz is required. However, its frequency is maintained sufficiently accurately in this mode of operation, because this frequency is derived from the possibly quartz-accurate reference signal. Also for this special mode of operation, the circuit arrangement according to the invention thus supplies an RDS carrier having a sufficient frequency accuracy.

We claim:

1. A circuit arrangement for gaining a 38 kHz stereo subcarrier and a 57 kHz RDS carrier for decoding a stereo signal comprised in a demodulated FM signal and/or an RDS signal comprised in a demodulated FM signal, characterized in that the arrangement comprises a phase-locked loop with a loop filter (1), a voltage-controlled oscillator (2), a first phase detector (3) which receives a reference signal having a reference frequency, and a second phase detector (4), which receives the FM signal, the output signal of the voltage-controlled oscillator (2) being coupled to both phase detectors (3,4) in a form divided down by means of dividers (6, 9; 10, 11), and the signal fed back to the second phase detector having a frequency of 19 kHz, in that dividers (9, 10, 12) are provided, by means of which the output signal of the voltage-controlled oscillator (2) is divided down and which supply the 38 kHz stereo subcarrier and the 57 kHz RDS carrier, in that a frequency control circuit (8), which is active only upon start-up of the circuit arrangement, compares the reference signal and the output signal of the voltage-controlled oscillator divided down, as applied to the first phase detector (3), and controls the voltage-controlled oscillator (2) in a predetermined frequency range around the reference frequency of the reference signal, in that, after reaching the predetermined frequency range, the frequency control circuit (8) is deactivated and the output signal of the first phase detector (3) is coupled to the loop filter (1), and in that subsequently, if the demodulated FM signal should comprise a 19 kHz pilot, the output signal of the second phase detector (4) is coupled to the loop filter (1).

2. An arrangement as claimed in claim 1, characterized in that the input of the loop filter (1) is coupled again to the output signal of the first phase detector (3) when the phase-locked loop unlocks during the operation when the output signal of the second phase detector (4) is coupled to the loop filter (1).

3. An arrangement as claimed in claim 1, characterized in that an electronic switch (5) is provided which is controlled by means of a control logic and by means of which the input of the loop filter (1) is coupled to a reference potential upon start-up, to the output of the first phase detector (3) after reaching the predetermined frequency range, and subsequently to the output of the second phase detector (4) if the demodulated FM signal should comprise a 19 kHz pilot.

4. An arrangement as claimed in claim 1, characterized in that a pilot detector (13) is provided which compares both input signals of the second phase detector (4).

5. An arrangement as claimed in claim 1, characterized in that at least one of the dividers (9, 10) is used in common for gaining the stereo subcarrier, the RDS carrier and/or the input signal of the second phase detector (4) derived from the output signal of the voltage-controlled oscillator (2).

6. An arrangement as claimed in claim 1, characterized in that the voltage-controlled oscillator (2) has a nominal frequency of 10.944 MHz, and in that the input signal of the first phase detector (3) derived from the output signal of the voltage-controlled oscillator (2) is gained by means of a divider (6) which divides the signal applied thereto by 3485.

7. An arrangement as claimed in claim 1, characterized in that the reference signal has a reference frequency of 75.368/24 MHz.

8. An arrangement as claimed in claim 1, characterized in that the first phase detector (3) is a digital phase detector and the second phase detector (4) is a linear phase detector.

9. An arrangement as claimed in claim 1, characterized in that the frequency control circuit (8) is switched off when, after start-up, the input of the loop filter (1) is coupled to the output of the first phase detector (3).

* * * * *